US012298393B2

(12) United States Patent
Beaudoin et al.

(10) Patent No.: US 12,298,393 B2
(45) Date of Patent: May 13, 2025

(54) FLIGHT TIME SENSOR AND SURVEILLANCE SYSTEM COMPRISING SUCH A SENSOR

(71) Applicant: VALEO COMFORT AND DRIVING ASSISTANCE, Créteil (FR)

(72) Inventors: Sylvain Beaudoin, Créteil (FR); Sebastien Trapani, Créteil (FR); Frédéric Autran, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 1004 days.

(21) Appl. No.: 17/413,766

(22) PCT Filed: Nov. 26, 2019

(86) PCT No.: PCT/EP2019/082602
§ 371 (c)(1),
(2) Date: Jun. 14, 2021

(87) PCT Pub. No.: WO2020/120128
PCT Pub. Date: Jun. 18, 2020

(65) Prior Publication Data
US 2022/0050202 A1    Feb. 17, 2022

(30) Foreign Application Priority Data

Dec. 14, 2018  (FR) .................................... 1872981

(51) Int. Cl.
*G01S 17/36* (2006.01)
*G01S 7/48* (2006.01)
(Continued)

(52) U.S. Cl.
CPC ............ *G01S 17/36* (2013.01); *G01S 7/4802* (2013.01); *G01S 7/4868* (2013.01);
(Continued)

(58) Field of Classification Search
CPC ...... G01S 17/36; G01S 17/894; G01S 7/4873; G01S 7/4868; G01S 7/4802; G06K 2209/401; G06V 2201/121
(Continued)

(56) References Cited

U.S. PATENT DOCUMENTS

2009/0273770 A1    11/2009  Bauhahn et al.
2022/0050203 A1*   2/2022   Keilaf ..................... G01S 17/93

FOREIGN PATENT DOCUMENTS

FR         3056304 A1     3/2018
WO    2012/085149 A1     6/2012

OTHER PUBLICATIONS

Larry Li; "Time-of-Flight Camera—An Introduction" Texas Instruments; Technical White Paper, SLOA190B; Jan. 2014, Revised May 2014 (10 pages).
(Continued)

*Primary Examiner* — Daniel L Murphy
(74) *Attorney, Agent, or Firm* — Osha Bergman Watanabe & Burton LLP

(57) ABSTRACT

The invention relates to a flight time sensor (10) comprising:—a lighting device (11) comprising a light source (12) which emits a source beam (13) in the direction of a scene (3) comprising an object (4) which is capable of reflecting the source beam;—a detector (15) comprising a matrix (16) of photo-sensitive pixels (16A) which receive a portion (18) of the source beam reflected by the object; and—an electronic unit (19) which is configured:—to generate a modulation signal and to control the device by means of this signal so that the source beans has a source light power which is modulated temporally;—to process electric signals which are supplied as a function of time by the detector, each electric signal representing a fraction of the source light power reflected in the direction of a pixel; and—to deduce from the electric signals a characteristic distance ($D_{obj}$)
(Continued)

between the object and the device. According to the invention, the unit is configured, when the object is detected as being at a characteristic distance smaller than a predetermined threshold distance, to control the device in order to reduce the average source light power.

7 Claims, 2 Drawing Sheets

(51) Int. Cl.
    *G01S 7/486*     (2020.01)
    *G01S 7/487*     (2006.01)
    *G01S 17/894*     (2020.01)

(52) U.S. Cl.
    CPC .......... *G01S 7/4873* (2013.01); *G01S 17/894* (2020.01); *G06V 2201/121* (2022.01)

(58) Field of Classification Search
    USPC ........................................................ 356/5.01
    See application file for complete search history.

(56) References Cited

OTHER PUBLICATIONS

International Search Report and Written Opinion corresponding to International Application No. PCT/EP2019/082602, mailed Feb. 4, 2020 (11 pages).

* cited by examiner

FLIGHT TIME SENSOR AND SURVEILLANCE SYSTEM COMPRISING SUCH A SENSOR

TECHNICAL FIELD OF THE INVENTION

The present invention relates in general to the field of viewing and detecting objects by way of an optical detection system.

It relates more particularly to a time-of-flight sensor for reconstructing the three-dimensional map of a scene containing one or more objects.

It also relates to a monitoring system comprising such a sensor.

TECHNOLOGICAL BACKGROUND

Time-of-flight sensors comprising the following are known:
- an illumination device comprising a light source emitting a source beam in the direction of a scene containing an object capable of reflecting this source beam; and
- a detector comprising a matrix array of photosensitive pixels and receiving a portion of the source beam reflected by this reflective object.

Generally speaking, the light source of the illumination device is either a light-emitting diode (LED) or a laser diode (for example a VCSEL laser diode). This source generally emits in a narrow band in the infrared region, for example around 900 nanometers. This ensures that the source beam is not visible to users present near the sensor (the human eye is sensitive only up to around 800 nm).

The detector, which is a "matrix" detector, is for example formed by a CMOS camera whose photosensitive pixels are sensitive in the IR, at least in an absorption band including the narrow emission band.

As described in the document "Time-of-Flight Camera—An Introduction" (Texas Instruments Technical White Paper SLOA190B, May 2014), the sensor measures the time, therefore called "time of flight", taken by the source beam to travel from the source to the object, then by the "reflected" beam to travel from the object to the detector. For this purpose, the source beam has to be temporally modulated.

To this end, provision is generally made for an electronic unit configured so as to generate a modulation signal and control the illumination device by way of this modulation signal such that the emitted source beam has a temporally modulated source light power.

Generally speaking, this electronic unit is also configured so as to:
- process electrical signals delivered as a function of time by the detector, each electrical signal being representative of a fraction of the source light power reflected by the object in the direction of an associated photosensitive pixel; and
- deduce, from the processed electrical signals, a characteristic distance between the object and the illumination device.

A time-of-flight sensor thus makes it possible to reconstruct a three-dimensional map of the scene that it observes and to detect shapes therein, or even to recognize objects therein (a human body or part of a human body, the eyes of a person, etc.).

In order to "see" far away (long range) and well (good signal-to-noise ratio), the electronic unit of the time-of-flight sensor controls the illumination device such that the average light power emitted from the source beam is sufficiently high.

SUBJECT OF THE INVENTION

In order to rectify the abovementioned drawback of the prior art, the present invention proposes a time-of-flight sensor that exhibits improved safety and avoids the risks of the source beam causing damage, in particular the risks of causing personal injury.

More particularly, what is proposed according to the invention is a time-of-flight sensor as defined in the introduction, wherein said electronic unit is furthermore configured so as, when said object is detected as being at a characteristic distance less than a predetermined threshold distance, to:
- control said illumination device so as to reduce, on average, said source light power below a predefined maximum value.

Thus, by virtue of the time-of-flight sensor of the invention, the level of infrared radiation experienced by the objects present in the scene and capable of reflecting this radiation is limited.

In one preferred embodiment, said electronic unit is also configured so as to generate a modified modulation signal in order to control said illumination device by way of this modified modulation signal.

In this case, when the time-of-flight sensor detects that an object is located at an excessively small characteristic distance from the light source, then the electronic unit modifies the modulation signal virtually instantaneously, such that the source beam has a limited light power.

The predefined maximum value may be for example a danger threshold for the skin or the eyes of a person. For example, when the illumination device comprises an LED source, this maximum value is defined in the international IEC 62471 standard ("Photobiological safety of lamps and lamp systems").

The predetermined threshold distance may in particular depend on this predefined maximum value.

The characteristic distance of the object detected by the time-of-flight sensor of the invention may be for example the average distance or else a weighted distance.

Said characteristic distance is preferably equal to the minimum distance between said illumination device and a particular point of the object reflecting said source beam in the direction of a photosensitive pixel of said detector. It is thereby ensured that, as soon as the object (or the person) enters a particular danger area, then the average light power is reduced so that no point of said object is illuminated with an excessively intense source beam.

Advantageously, if said predetermined threshold distance is less than 30 centimeters, preferably less than 20 centimeters, the modified modulation signal controls the deactivation of said light source.

Other non-limiting and advantageous features of the time-of-flight sensor according to the invention are as follows:
- with said modulation signal being such that said modulated source light power comprises a periodic succession of light pulses, said modified modulation signal is adjusted such that the source light power comprises a reduced number of light pulses and/or light pulses of narrower width and/or of lower intensity; and
- said electronic unit is furthermore configured so as, when said object is then detected as being at another characteristic distance greater than said predetermined threshold distance, to generate another modified modulation signal and control said illumination device by way of this modified modulation signal so as to increase said source light power beyond a predefined minimum value.

The time-of-flight sensor described above advantageously forms part of a monitoring system intended to monitor the inside of a passenger compartment of a motor vehicle.

The invention therefore also proposes a monitoring system comprising a time-of-flight sensor as defined above.

In one preferred embodiment, the reduction in the source light power by the time-of-flight sensor is furthermore conditional upon the recognition of said object as being a head of an occupant (driver, passenger, etc.) of said motor vehicle.

DETAILED DESCRIPTION OF ONE
EXEMPLARY EMBODIMENT

The following description with reference to the appended drawings, which are provided as non-limiting examples, will facilitate understanding of the invention and how it may be carried out.

FIG. 4 and

Figure 3:
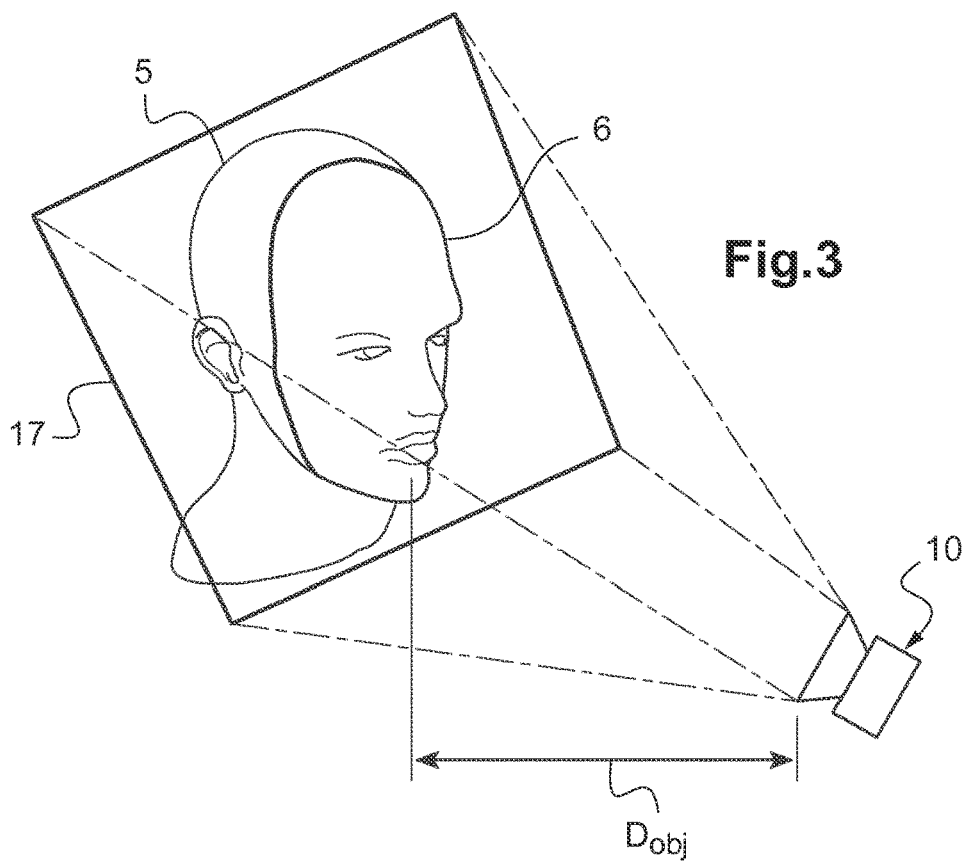
FIG. 3 shows a human head detected in the passenger compartment of the vehicle from FIG. 1.
Figure 5:
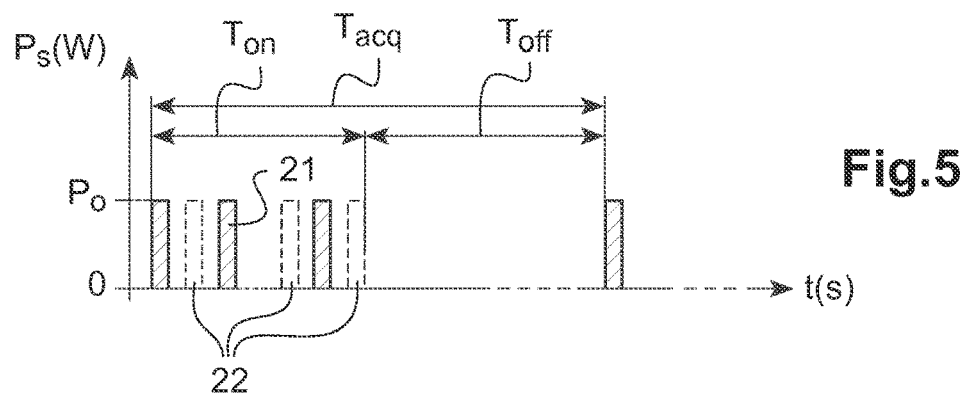

FIG. 5 are graphs showing examples of the modulation of the source power emitted by the time-of-flight sensor from FIG. 3.

Figure 1:
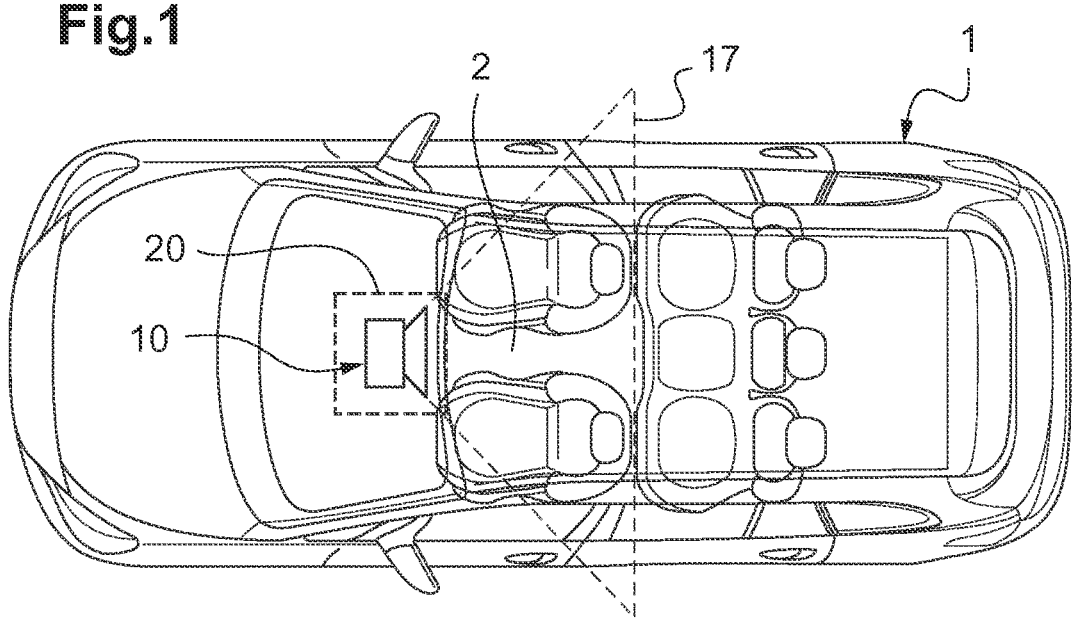
FIG. 1 is a schematic view of a vehicle and of its passenger compartment, which comprises a time-of-flight sensor integrated into a monitoring system for monitoring the passenger compartment.

FIG. 1 shows a motor vehicle 1 and its passenger compartment 2, with the front and rear seats.

A monitoring system 20 is housed inside the passenger compartment 2 of the motor vehicle 1 so as to allow the compartment environment and its occupants (driver, front and/or rear passenger(s)) to be acquired.

This type of monitoring system is also called an "Interior Monitoring System"or IMS. It comprises a time-of-flight sensor 10 (hereinafter denoted "sensor 10") that is generally positioned in the roof modules of the motor vehicle 1, but may also be in front of the driver, near the upright or in the central console.

The sensor 10 is oriented directly toward the occupants of the automobile and has a field of view 17 (see FIG. 1), in this case so as to cover all possible positions of the occupants of the motor vehicle 1.

As shown schematically in FIG. 2, the sensor 10 comprises three elements that will be described in more detail below: an illumination device 11, a detector 15 and an electronic unit 19.

Generally speaking, the sensor 10 faces a scene 3 containing various "objects" (represented here by geometric shapes) capable of reflecting light, in particular infrared (IR) light. These objects may for example be the head of the driver or of the passenger. In the following text, consideration will be given, by way of example for the explanation, to the particular case of the cube 4 as reflective object.

The illumination device 11, which may be controlled by the electronic unit 19 (the way in which this is achieved will be seen in the remainder of the description), comprises a light source 12 whose light power may be modulated, for example via current control.

When controlled in this way, the illumination device 11 emits a source beam 13 (see FIG. 2) in the direction of the scene 3 containing the object 4 that will reflect the source beam 13.

The light source 12 is preferably a source emitting electromagnetic radiation at a wavelength that is barely visible or is invisible to the human eye. This light source 12 advantageously emits in the infrared region.

The light source 12 is in this case a light-emitting diode (or LED) emitting in the IR, at a wavelength of 940 nm, with an emission width of 60 nm (+/−30 nm around the center wavelength).

As a variant, the diode could emit at a wavelength of 850 nm, or else at any other wavelength in the near-infrared between 800 nm and 1100 nm, or even possibly at a wavelength in the far-red visible spectrum, between 700 nm and 800 nm.

In other embodiments, the light source of the device may be a laser diode, in particular a VCSEL ("Vertical-cavity surface-emitting laser") laser diode, for example a GaAs/AlGaAs laser diode emitting between 700 nm and 1100 nm.

In particularly advantageous embodiments, the illumination device 11 may comprise an optical system located downstream of the light source 12 for shaping the source beam 13 (see FIG. 2) emitted by the light source 12. This optical system may be formed simply by a single lens, or else by a doublet. As a variant, provision may be made for a complex optical system for giving the source beam 13 particular properties (numerical aperture, polarization, optical quality, etc.).

Figure 2:
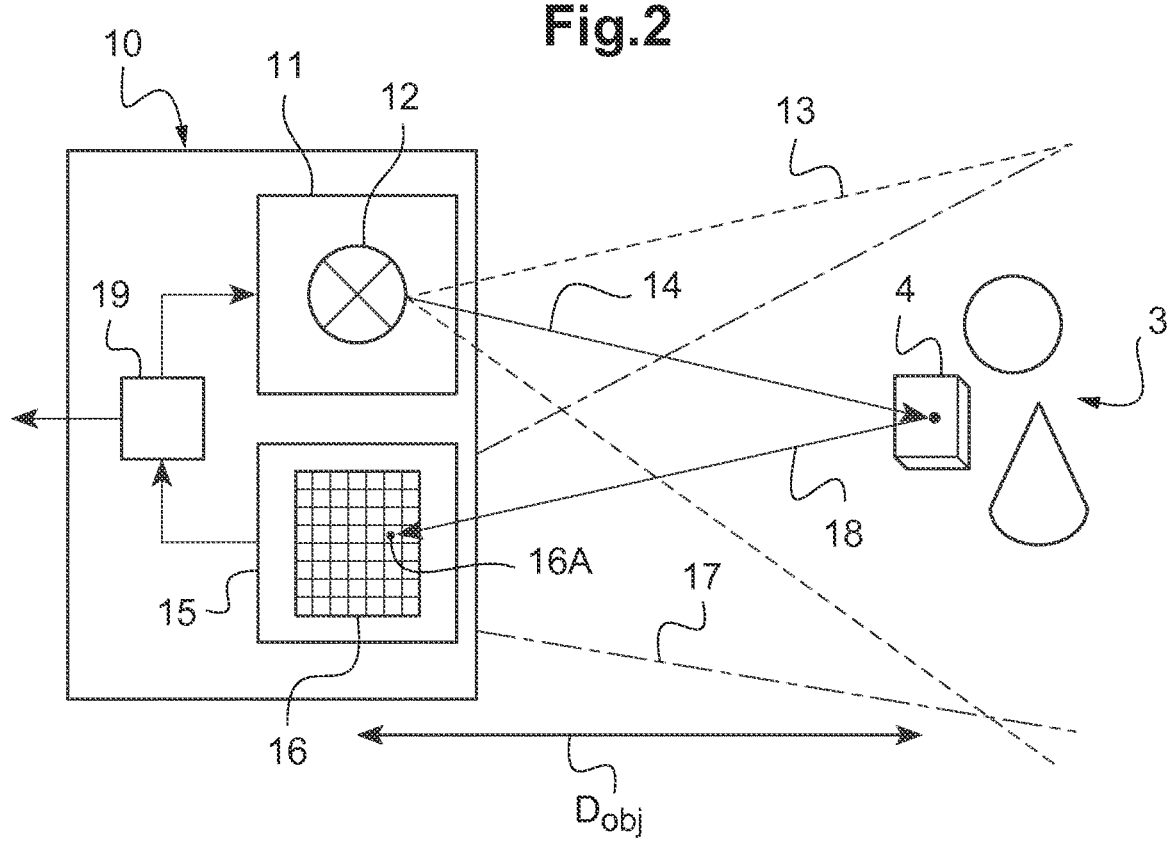
FIG. 2 is a schematic view of the time-of-flight sensor from FIG. 1, showing the operating principle of the time-of-flight measurement.

The electronic unit 19 is configured so as to generate a modulation signal, for example a modulated current signal, intended for the illumination device 11 (see arrow between the unit 19 and the device 11 in FIG. 2).

Controlled by way of this modulation signal, the light source 12 emits a source light beam 13 that has a source light power $P_s$ that is temporally modulated.

Figure 4:
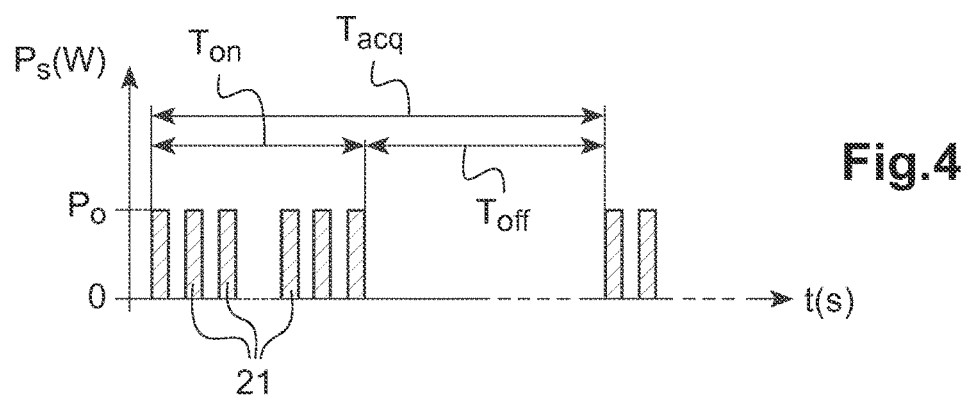

This may be seen in FIG. 4, where the ordinate shows the variations in the source light power $P_s$ (in watts W) emitted by the illumination device 11 as a function of time t (in seconds s).

The modulation signal is in this case such that, during an activation period $T_{on}$ (also called "integration period"), typically between 1 µs and 10 ms, the illumination device emits a periodic succession of square-wave pulses 21 of peak power $P_0$ and of width $\Delta t$ between 5 nanoseconds and 500 nanoseconds, at a frequency between 1 and 100 megahertz (MHz).

During another period, called inactivation period To, the modulation signal is such that the illumination device 11 does not emit a source beam (the current signal received at the input of the illumination device—and therefore of the light source—for example being a zero current signal).

The set formed by the activation period $T_{on}$ and the inactivation period $T_{off}$ constitutes an acquisition period $T_{acq}$.

In other embodiments, the modulation signal could be a sinusoidal signal, such that the source light power is modulated sinusoidally as a function of time.

As shown in FIG. 2, a portion 14 of the source beam 13 emitted by the illumination device 11 is reflected by the object 4 present in the scene 3. To be detected, the object 4 has to be in the field of view 17 of the sensor 10 so that the reflected beam 18 is intercepted by the detector 15.

This detector 15 is a matrix detector (for example a "focal plane array") and comprises a matrix array 16 of photosensitive pixels ("pixel array"), photosensitive in particular at the emission wavelength of the light source 12, that is to say in the infrared here.

Advantageously, the detector 15 may also comprise a collection optic, for example a simple lens or a more complex optical system.

The detector 15 receives a portion 18 of the source beam 13 (reflected beam 18) reflected by the object 4 in the direction of the detector 15.

Since the source beam 13 is temporally modulated, the reflected beam 18 is also temporally modulated (the reflection from the object 4 does not modify this property).

Due to the propagation of light from the light source 12 to the object 4, and then from the object 4 to the detector 15, there is a shift ("time shift") at arrival between the time when the source beam 14 is emitted and the time when the reflected beam 18 is collected by the matrix array 16 of the detector 15. By determining this time shift, it is possible to ascertain the time of flight of the light between the illumination device 11 and the detector 15 (see the Texas Instruments document cited above).

This determination of the time of flight may be performed for each pixel of the matrix array 16, such that it is then possible to reconstruct a true three-dimensional map of the scene 3 in front of the sensor 10. Specifically, each photosensitive pixel of the matrix array 16 delivers an electrical signal as a function of time that is proportional to the amount of light received by the pixel, For example, for the particular pixel 16A in FIG. 2, the electrical signal is representative of the fraction (reflected beam 18) of the source light power $P_s$ reflected by the object 4 in the direction of said photosensitive pixel 16A.

The electronic unit 19 of the sensor 10 is appropriately configured so as to:
  process these electrical signals delivered as a function of time by the detector 15; and
  deduce, from the processed electrical signals, a characteristic distance $D_{obj}$ between the object 4 in the scene 3 and the illumination device 11.

According to the invention, the electronic unit 19 is furthermore configured so as, when the object 4 is detected as being at a characteristic distance $D_{obj}$ less than a predetermined threshold distance $D_{min}$, to:
  generate a modified modulation signal; and
  control the illumination device 11 by way of this modified modulation signal so as to reduce, on average, the source light power $P_s$ below a predefined maximum value $P_{max}$.

In other words, if the sensor 10 detects that the object 4 is too close, then it decreases the average power of the light source 12 so as to limit the infrared radiation received by the object 4 with the source beam 13.

In one preferred embodiment of the monitoring system 20 from FIG. 1, the reduction in the source light power is furthermore conditional upon the recognition of said object as being the head 5 of an occupant of the motor vehicle.

Specifically, in a motor vehicle context, this may be useful when the detected object 4 is the head of a person (driver or passenger), because this avoids irradiating the skin and/or the eyes of the person with an excessively high power, which could be problematic in some situations.

The object may be recognized as being the head of an occupant of the vehicle for example by determining that the visible surface or the volume of said object corresponds to that of a human head.

In another example, the monitoring system includes processing by software capable of distinguishing, in a three-dimensional representation of the observed scene, that the detected volume is a human head.

FIG. 5 shows one example of a source light power $P_s$ modified by controlling the illumination device 11 with the modified modulation signal generated by the electronic unit 19 after the object 4 has been detected as being at a characteristic distance $D_{obj}$ less than the threshold distance $D_{min}$.

As may be seen in this FIG. 5, this modified source light power $P_s$ is such that only one out of two square-wave pulses 21 has been kept (the even-order pulses 22 in dashed lines have been removed), while at the same time keeping its peak level $P_0$ and its activation period $T_{on}$. Thus, on average, the source light power $P_s$ is divided by two here.

In one alternative embodiment, it would be possible to keep all of the pulses of the modulation of the source beam 13 and to reduce the peak power of the pulses, for example to a value $P_0/2$ (so as to have an average light power of half). This may be achieved easily by dividing the modulation current sent to the light source 12 by two.

In yet another alternative embodiment, it would be possible to keep all of the pulses of the activation period $T_{on}$ but to reduce the width of the pulses (for example by dividing it by two).

In yet another embodiment, it would be possible to keep the pulses with their original width and power, but to reduce the duration of the activation period $T_{on}$. For example, by dividing this period by 2, the average illumination power is also divided by 2.

In one particularly safe embodiment, the characteristic distance $D_{obj}$ of the object 4 may be taken to be equal to the minimum distance between the illumination device 11 and a particular point of the object 4 reflecting the source beam 14 in the direction of a photosensitive pixel 16A of the detector 15.

Thus, in this embodiment, it is sufficient for a single particular point of the object 4 (for example the head 5 of the driver, see FIG. 3) to be at a distance less than the threshold distance $D_{min}$ for the electronic unit 19 to modify the modulation signal so as to limit the source light power $P_s$.

In the general case, the threshold distance $D_{min}$ depends on the average source light power $P_s$.

In practice, the average source light power $P_s$ is determined so as to be lower than the danger levels defined by the IEC 62471 standard for light-emitting diodes and by the IEC 60825-1 standard for laser diodes.

In another even safer embodiment, with the predetermined threshold distance $D_{min}$ being less than 30 centimeters, or even less than 20 cm, the modified modulation signal generated by the electronic unit 19 controls the deactivation of the light source 12 of the illumination device 11. In other words, in this particular embodiment, the light source is completely shut off, for example by stopping the current driving the source.

The electronic unit 19 is advantageously furthermore configured so as, when the object 4 previously detected as being too close to the sensor 10 is then detected as being at another characteristic distance $D_{obj}$ greater than the predetermined threshold distance $D_{min}$, to:
  generate another modified modulation signal; and
  control said illumination device by way of this modified modulation signal so as to increase said source light power beyond a predefined minimum value.

It is thereby then possible to detect the object that was previously too close when it has moved away. Specifically, the range of the sensor 10 increases with the average light power of the source beam 13. By increasing the source light power, it is ensured that it will be possible to detect the object 4 again when it approaches.

In practice, the other modified modulation signal is preferably identical to modulation signal generated before the object was detected as being too close. The profile of the source light power $P_s$ is then the one shown in FIG. 4.

The invention claimed is:

1. A time-of-flight sensor comprising:
   an illumination device comprising a light source and configured designed to emit a source beam in the direction of a scene containing an object capable of reflecting said source beam;
   a detector comprising a matrix array of photosensitive pixels and designed to receive a portion of the source beam reflected by said object in the scene; and
   an electronic unit configured so as to:
   generate a modulation signal and control said illumination device by way of this modulation signal, such that the emitted source beam has a temporally modulated source light power;
   process electrical signals delivered as a function of time by said detector, each electrical signal being representative of a fraction of the source light power reflected by the object in the direction of an associated photosensitive pixel; and
   deduce, from said processed electrical signals, a characteristic distance between said object and said illumination device,
   wherein said electronic unit is configured so as, when said object is detected as being at a characteristic distance less than a predetermined threshold distance, to:
   control said illumination device so as to reduce, on average, said source light power below a predefined maximum value, and
   wherein the characteristic distance is a minimum distance between the illumination device and a particular point of the object reflecting the source beam in the direction of a photosensitive pixel of the detector.

2. The time-of-flight sensor as claimed in claim 1, wherein said electronic unit is configured to generate a modified modulation signal in order to control said illumination device by way of this modified modulation signal.

3. The time-of-flight sensor as claimed in claim 2 wherein, with said predetermined threshold distance being less than 30 centimeters, the modified modulation signal controls the deactivation of said light source.

4. The time-of-flight sensor as claimed in claim 2, wherein, with said modulation signal being such that said modulated source light power comprises a periodic succession of light pulses, said modified modulation signal is adjusted such that the source light power comprises a reduced number of light pulses or light pulses of narrower width or of lower intensity.

5. The time-of-flight sensor as claimed in claim 2, wherein said electronic unit is furthermore configured so as, when said object is then detected as being at another characteristic distance greater than said predetermined threshold distance, to:
   generate another modified modulation signal; and
   control said illumination device by way of this modified modulation signal so as to increase said source light power beyond a predefined minimum value.

6. A monitoring system configured to monitor the inside of a passenger compartment of a motor vehicle and comprising a time-of-flight sensor as claimed in claim 1.

7. The monitoring system as claimed in claim 6, wherein the reduction in the source light power is further conditional upon the recognition of said object as being a head of an occupant of said motor vehicle.

* * * * *